S. K. CLEVEN & O. A. DUNHAM.
STREET SWEEPER.
APPLICATION FILED OCT. 15, 1915.

1,197,345.

Patented Sept. 5, 1916.
7 SHEETS—SHEET 1.

S. K. CLEVEN & O. A. DUNHAM.
STREET SWEEPER.
APPLICATION FILED OCT. 15, 1915.

1,197,345.

Patented Sept. 5, 1916.
7 SHEETS—SHEET 5.

UNITED STATES PATENT OFFICE.

SEVER K. CLEVEN AND OBADIAH A. DUNHAM, OF MANCHESTER, IOWA, ASSIGNORS TO MANCHESTER MACHINE COMPANY, OF MANCHESTER, IOWA, A CORPORATION OF IOWA.

STREET-SWEEPER.

1,197,345.   Specification of Letters Patent.   Patented Sept. 5, 1916.

Application filed October 15, 1915. Serial No. 56,129.

*To all whom it may concern:*

Be it known that we, SEVER K. CLEVEN and OBADIAH A. DUNHAM, citizens of the United States of America, and residents of Manchester, Iowa, have invented a certain new and useful Improvement in Street-Sweepers, of which the following is a specification.

Our invention relates to street sweeping apparatus of the kind in which the sweeping machine is connected to a wagon or other vehicle, and in which a conveyer or elevator is arranged to extend upwardly and forwardly from the brush to a point directly over the said vehicle, the latter having a receptacle to receive the sweepings from the upper and forward end of the said conveyer.

Generally stated, the object of our invention is to provide an improved and highly efficient sweeping apparatus of the foregoing general character.

Special objects are to provide a more satisfactory draft connection between the sweeper and the wagon or other vehicle ahead, whereby the apparatus may turn abruptly in either direction, or turn sharply around, without danger of breaking or disturbing the connections between the wagon and the sweeper; to provide an improved construction and arrangement whereby the brush and receiver or housing into which the sweepings are thrown by the brush, as well as the conveyer or elevator which extends upwardly and forwardly therefrom, are capable of being readily raised and lowered; to provide an improved construction and arrangement for spraying the ground immediately in front of the said receiver or housing, thereby to prevent dust; and to provide an improved general construction and arrangement which will facilitate the operation and handling of the different instrumentalities involved in a street sweeping apparatus of this particular character.

It is also an object to provide certain details and features of construction and novel combinations tending to increase the general efficiency and serviceability of a street sweeping apparatus of this particular character.

To the foregoing and other useful ends our invention consists in matters hereinafter set forth and claimed.

In the accompanying drawings, Fig. 14, is a transverse section of said elevator on line 14—14 in Fig. 12.

As thus illustrated, our invention comprises a dump wagon A provided with a receptacle $a$ having a ring B mounted on the top thereof, forming an inlet opening for the dump wagon, and a rotary collar $b$ surrounding said ring and suitably held thereon by a removable flange C, whereby said collar rotates or turns about a vertical axis. This collar $b$ is provided with rearwardly extending parallel portions (1) which embrace the upper and forward end of the reach D and which are provided at their ends with upturned portions (2) forming shoulders. The draft connection or reach D is provided with a transverse draft pin $d$ which engages the said shoulders formed by the portions (2). The rear end of this reach is provided with a fork (3) which is pivoted at (4) on the front end of the body or platform E, whereby the latter is drawn forward by the dump wagon. A collar (5) is slidable on the portions (1) to move over the end portion (6) of the reach, and this collar has a pivoted hook (7) which engages a pin (8) on one of the portions (1), whereby said collar is held in position to hold the end portion (6) against either upward or downward displacement. At the same time, however, when the apparatus is traveling over uneven ground, the pin *d* can move up and down on the shoulders (2), whereby sufficient up and down play is provided in the joint thus formed to prevent breakage thereof. The dump wagon can back up slightly until the collar (5) engages near the pin *d*, and while this connection is not flexible laterally it has sufficient up and down play and flexibility to give the desired result. If preferred, the collar (5) may be left off or omitted from the construction. It will also be understood that, so far as the broader aspects of the invention are concerned, the joint between the reach D and the rotary collar *b* may be of any suitable or desired character. The said body E is provided with two rear wheels *e* and with a front caster wheel F, the front end of the body having tapered sides *f* which, in conjunction with the said caster wheel and the draft connection previously described, allow the dump wagon to turn sharply around in either direction. In other words, said wagon can swing around until its side is close to either side *f* of the tapered front end of the body. Brackets (9) are secured to the sides of the body E, and tilting arms G are mounted on the lower ends of these brackets, a rotary brush *g* of cylindric form being suitably mounted in bearings at the forward ends of these arms. The rear end portions of said arms are provided with weights (10) or other suitable means to counterbalance or tend to counterbalance the weight of said brush. A receiver or dirt catcher H is disposed immediately in front of said brush and is provided with a rearwardly extending hood *h* for covering the brush, the said receiver and hood being preferably formed from sheet metal, and flexible flaps (11) and (12) being mounted to drag on the ground immediately in front and rear of said brush, these flaps being suitably secured to the lower edges of the sheet metal. A conveyer I extends upwardly and forwardly from the receiver H, it being arranged to occupy an opening (13) in the front portion of the platform of the body E, and the forward end of the body having a roll (14) which engages the under side of said conveyer. The upper and forward end of said conveyer is provided with a downturned spout *i* which leads to the opening (15) in the top of the dump wagon, whereby the said conveyer and the reach D swing latterly about one and the same vertical axis of movement relative to the dump wagon. Conseqently, the said wagon can turn to either side without bringing the opening (15) out of line with the lower end of the spout *i*, thus making it possible to continue the sweeping operation without any difficulty while turning corners. The receiver H and its housing extension *h* are suported by chains J which extend rearward and are wound upon a shaft *j* suitably supported in bearings on the bottom of the platform. A worm wheel (16) is secured on said shaft and arranged to engage the worm (17) on the lower end of the vertical hand wheel shaft (18), which latter has a hand wheel (19) at the upper end thereof. With this arrangement, and by rotating the said hand wheel, the shaft *j* operates as a windlass or winding drum to raise and lower the said receiver and housing. This, of course, serves also to raise and lower the conveyer I, causing the latter to slide up and down on the roll (14) which engages the bottom thereof. For this purpose, the said conveyer practically comprises an endless link belt K provided with blades *k* for carrying the dirt or sweepings, and a tube-like casing (20) which is formed with a flat reinforced bottom (21) that forms the trough for the upwardly moving conveyer blades, and which serves to stiffen the conveyer throughout the entire length thereof. See Figs. 12, 13 and 14. Springs (22) connect the front portion of the dirt receiver H with the body E, thereby to cushion the lowering of the conveyer and receiver.

Figure 1:
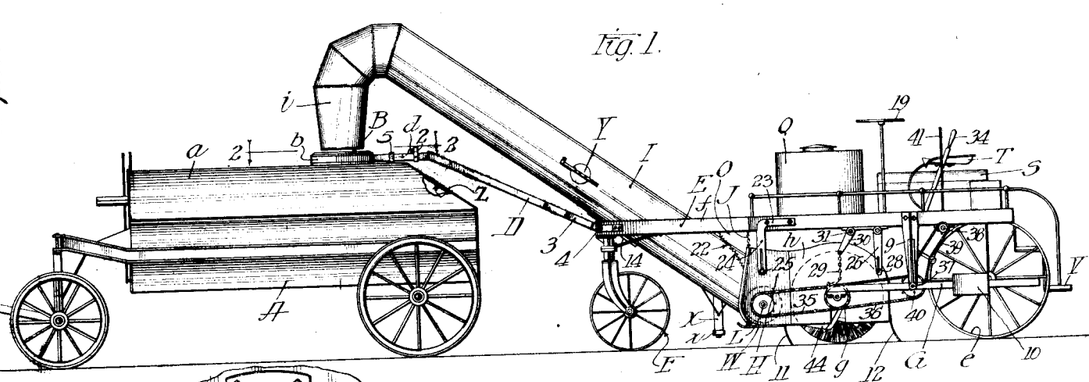
Figure 1, is a side elevation, in the nature of a diagram, showing the general arrangement and organization of a street sweeping apparatus embodying the principles of our invention.
Figures 2, 3:
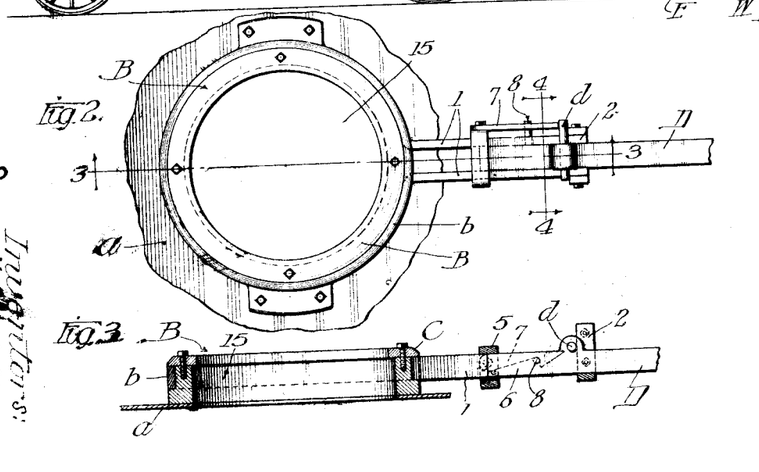
Fig. 2, is an enlarged detail section on line 2—2 in Fig. 1.
Fig. 3, is a vertical section on line 3—3 in Fig. 2.
Figure 4:
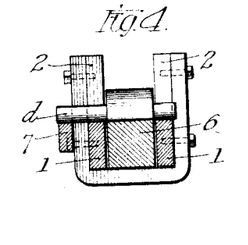
Fig. 4, is an enlarged cross section on line 4—4 in Fig. 2.
Figure 5:
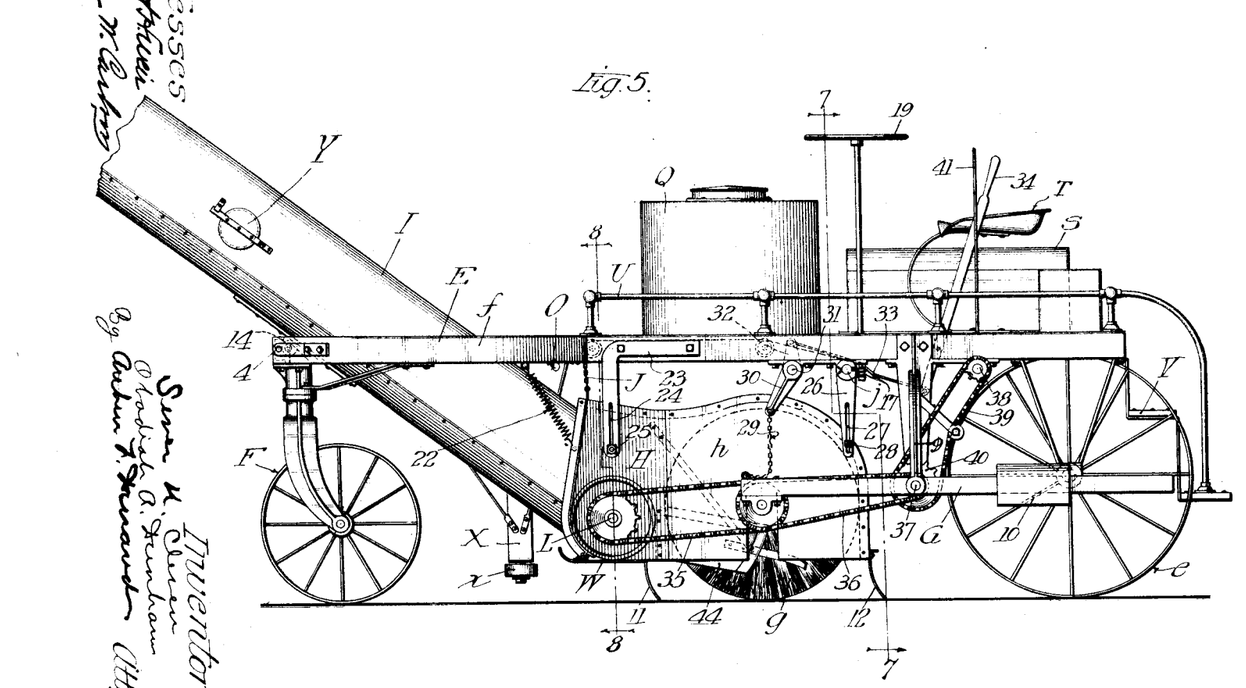
Fig. 5, is an enlarged side elevation of the sweeper body and the different elements mounted thereon.
Figure 6:
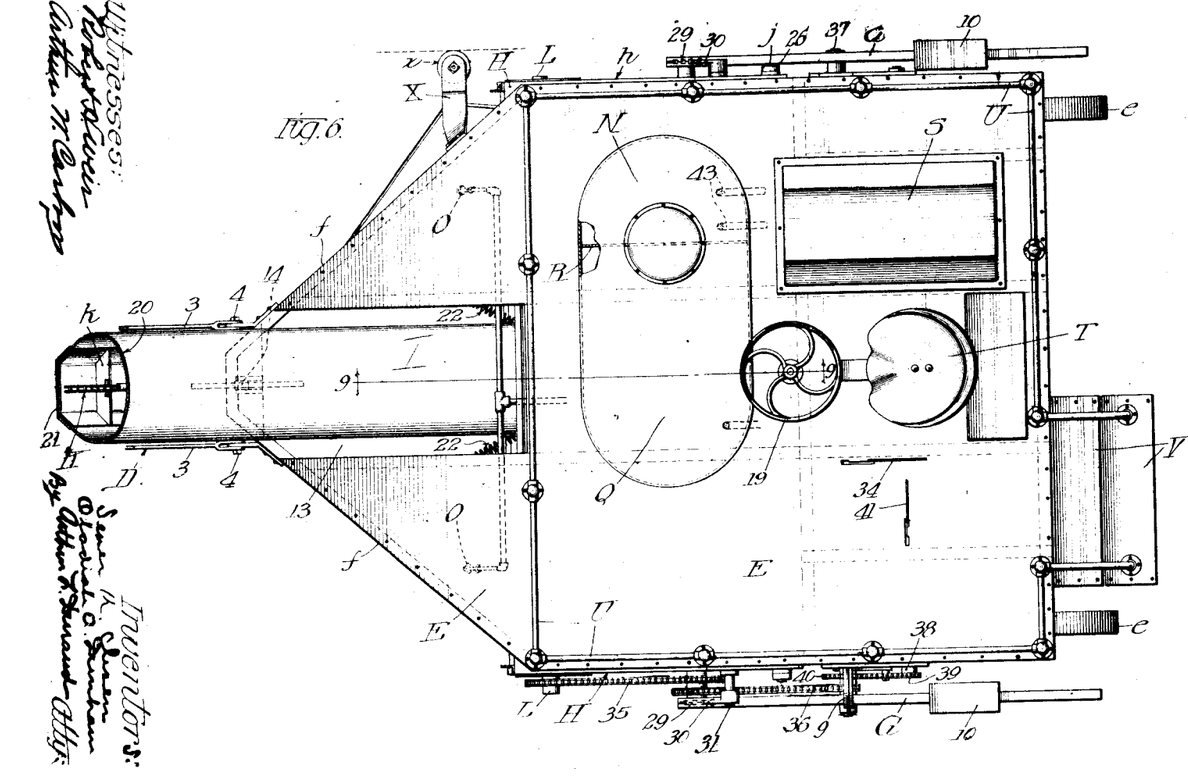
Fig. 6, is a plan of the construction shown in Fig. 5.
Figure 7:
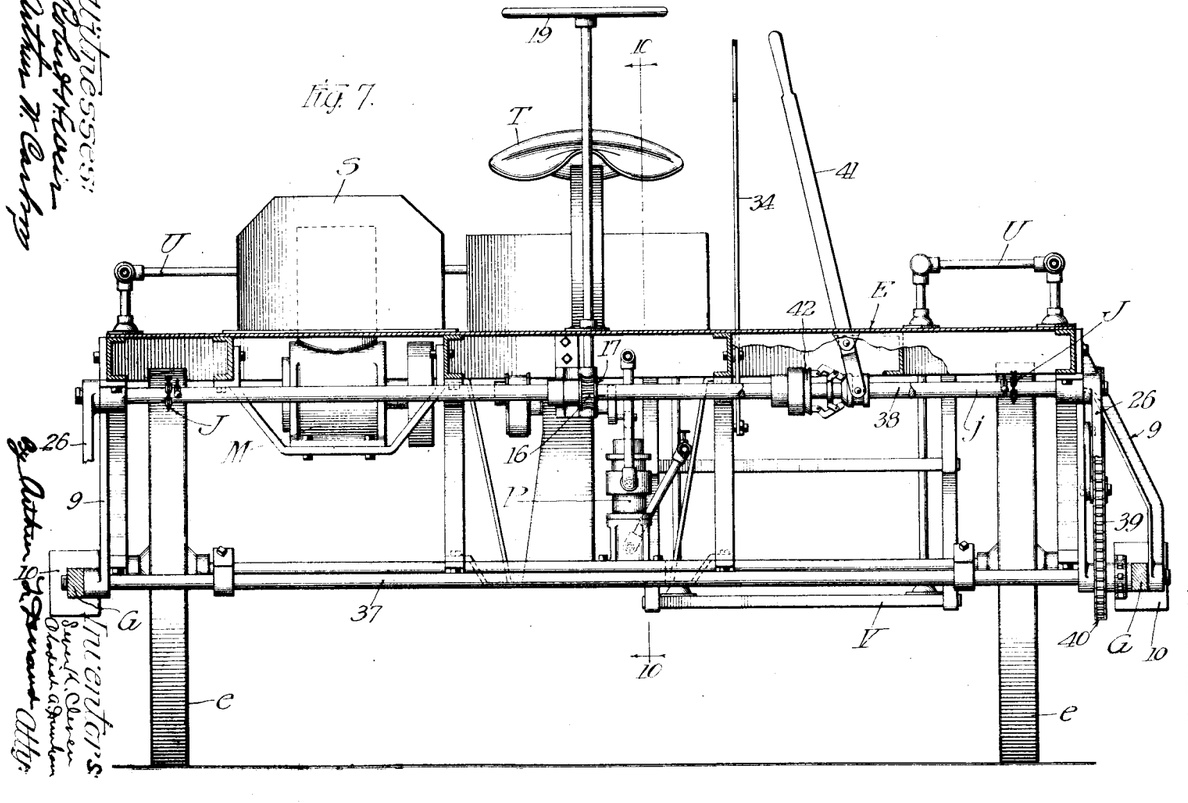
Fig. 7, is an enlarged transverse section on line 7—7 in Fig. 5.
Figure 8:
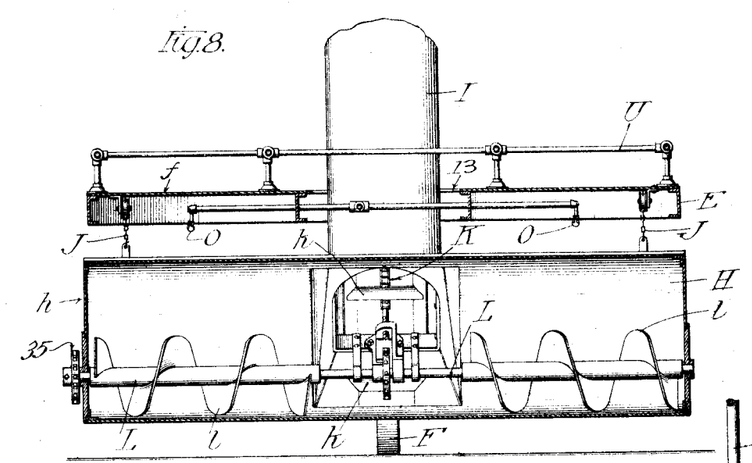
Fig. 8, is a section on line 8—8 in Fig. 5.
Figure 9:
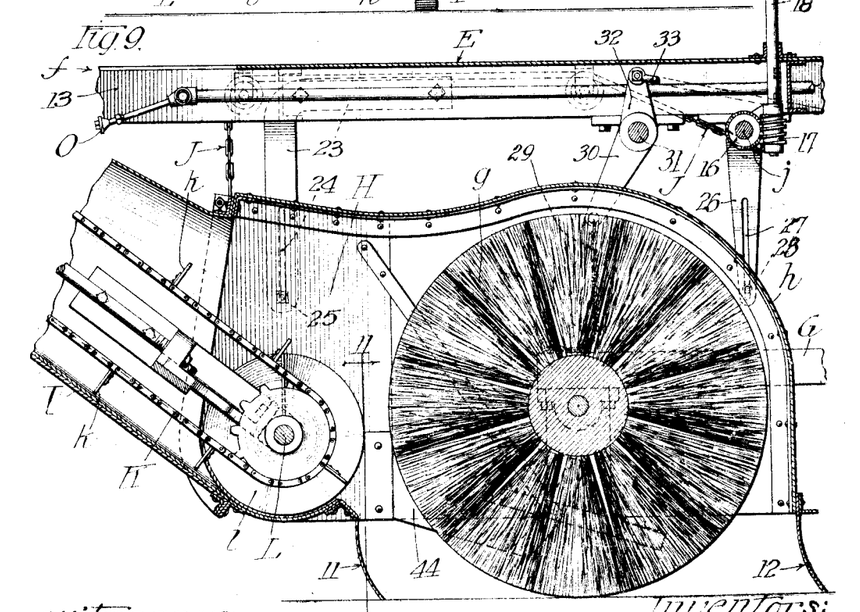
Fig. 9, is a section on line 9—9 in Fig. 6.
Figure 10:
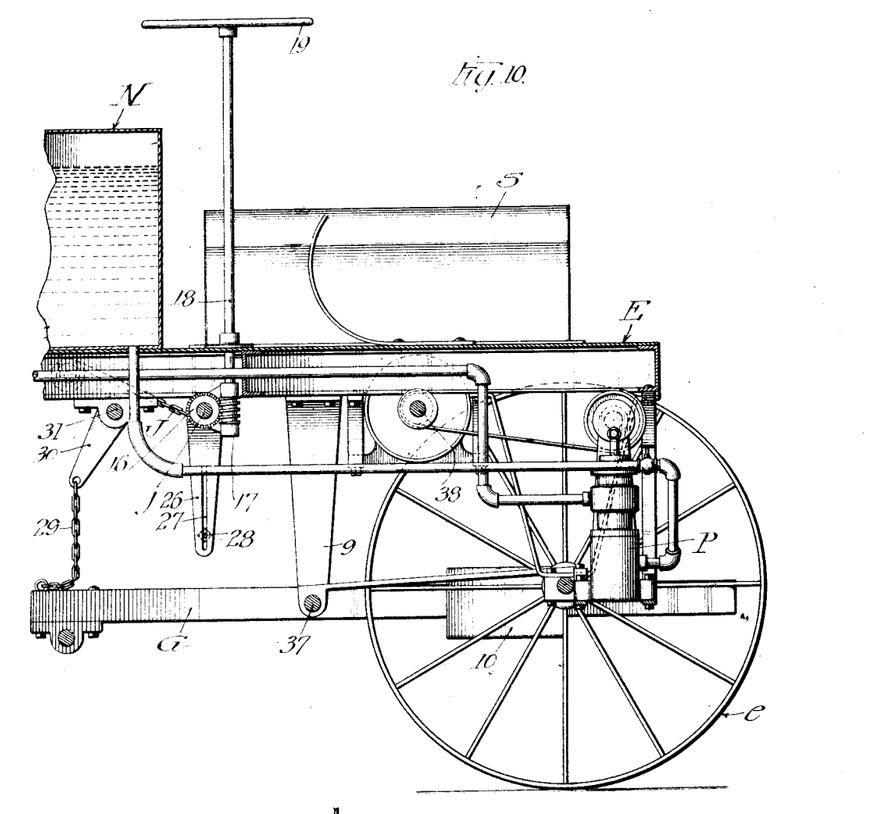
Fig. 10, is a vertical section on line 10—10 in Fig. 7.
Figure 11:
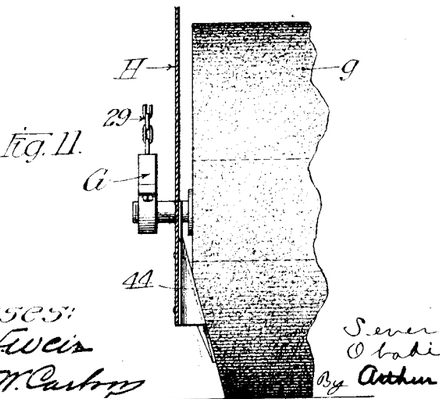
Fig. 11, is a detail section on line 11—11 in Fig. 9.
Figures 11, 12, 13:
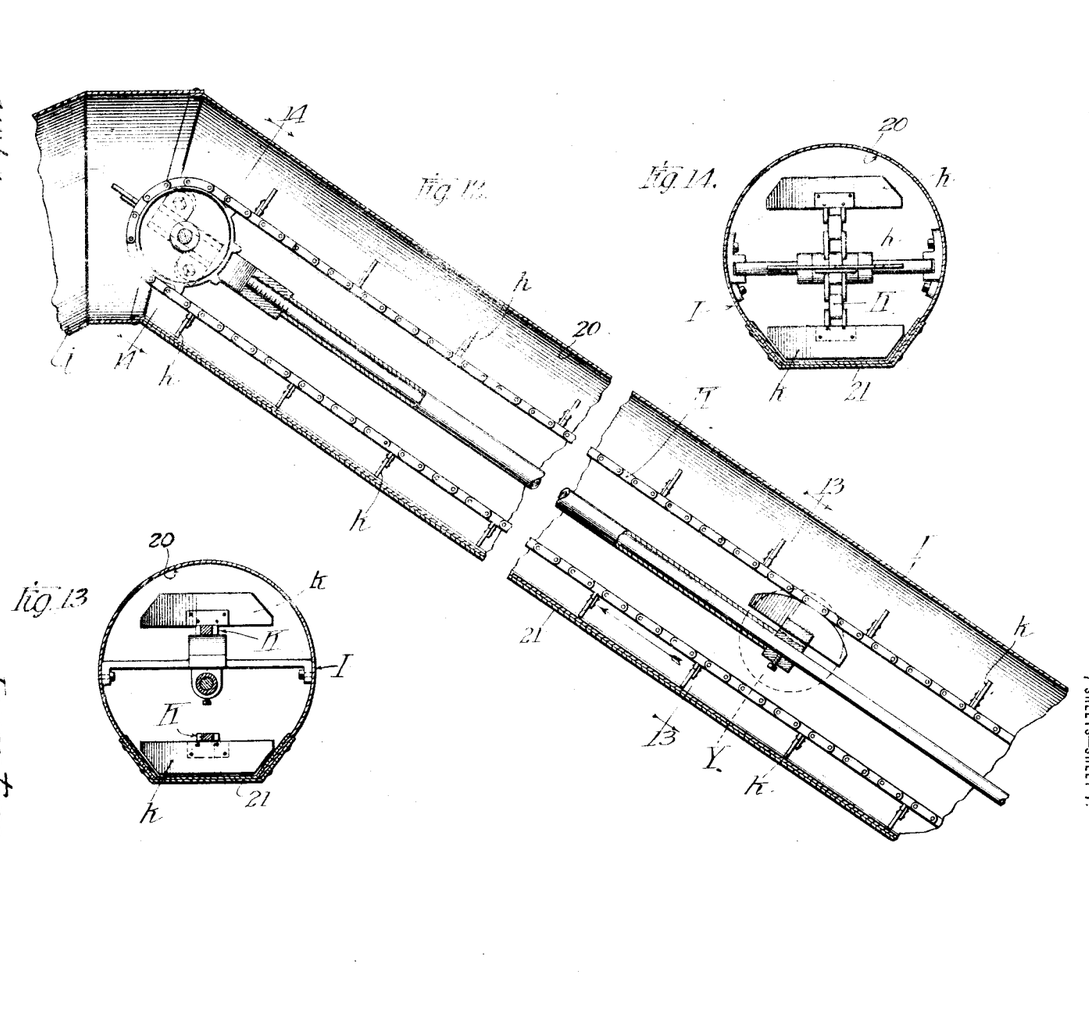
Fig. 12, is a longitudinal vertical section of the conveyer or elevator by which the sweepings are carried upward and forward from the collector or receiver immediately in front of the brush to a point directly over the dump wagon or other vehicle which travels ahead of the sweeper.
Fig. 13, is a cross section of said elevator on line 13—13 in Fig. 12.

The rigid guides (23) are secured to the sides of the body and provide the slots (24) for the pins or bolts (25) on the sides of the receiver, and swinging guides (26) having slots (27) for the bolts or pins (28) on the sides of the housing *h* are hung on the end portion of the shaft *j*, being removably secured thereon in any suitable manner. These guides (23) and (26) support the sheet metal structure forming the receiver H and housing *h*, but permit the same to rise when the hand wheel (19) is operated for this purpose. Chains (29) have their lower ends secured to the forward ends of the arms G and have their upper ends attached to the crank arms (30) on the ends of the rock shaft (31), which latter is supported in suitable bearings on the under side of the body frame. This shaft has a crank arm (32) connected by a link (33) with the lower end of the pivoted hand lever (34), whereby said shaft may be rocked to raise the brush from the ground. Any suitable means can be employed for holding the hand lever (34) in different positions, or in the position necessary to keep the brush raised from the ground. As the chains (29) are flexible, said brush *g* can rise freely of its own accord, when traveling over elevations or obstructions, and is held on the ground by its own weight; but while in operation the weight of the brush is sufficiently counterbalanced by the weights (10) to prevent crushing of the bristles of the brush against the ground. A shaft L is mounted horizontally on the receiver H and provided with a pair of screw conveyers *l* which operate to deliver the sweepings to the lower end of the elevator or conveyer *l* in a manner that will be readily understood. The outer end of this shaft L is connected by a sprocket chain (35) with a sprocket on the end of the brush shaft, and the latter is connected by a sprocket chain (36) with the transverse shaft (37) below the body. A shaft (38) is arranged to rotate in bearings immediately below the platform of the body and is connected by a sprocket chain (39) with sprocket 40 on shaft (37), thus forming a power transmitting connection for driving the brush. Preferably the said shaft (38) is the shaft of an engine or motor M of any suitable character. Desirably, this motor M is an internal combustion engine, and a hand lever (41) and suitable clutch (42) are provided to control the transmission of power from this engine to the shaft (38), as will be readily understood. A tank N is provided with inlet and outlet connections (43) which extend to the water jacket of the said engine, whereby the latter is maintained in proper condition. Nozzles O are disposed in front of the receiver H, at opposite sides of the conveyer I, and are suitably connected by pipes with the pump P at the rear of the sweeper body, this pump being in turn suitably connected with the tank Q. It will be observed that the tanks N and Q are separated by the partition R extending across the tank structure to divide the same into two compartments, one for the engine and the other for the said spray nozzles. Thus, when the sweeper is in action, the ground ahead of the receiver H is sprayed sufficiently to prevent, or at least greatly reduce, the dust which would otherwise be formed in the rear of the brush as the machine travels along the street. A hood S is secured to the platform to cover the said engine. A seat T is disposed at the left of said hood and immediately in the rear of the hand wheel (19), whereby the operator may conveniently control the entire machine. A railing U extends around the edge of the platform, in the manner shown, and steps V are provided at the rear of the platform. Runners W are secured to the bottom of the receiver H at the sides thereof, to slide over obstructions. A post X extends downward from the right-hand side of the platform, immediately in front of the receiver H, and has its lower end provided with a roll or wheel *x* to engage the curb at the side of the street, thereby to prevent the brush from running onto the curb. A hand hole Y is provided on the side of the conveyer I in order to afford access to the interior thereof. The dump wagon is of any suitable known or approved construction and is provided at the rear end thereof with an opening Z to afford a view of the interior. As shown in Figs. 9 and 11, the inclined plates (44) are disposed at the opposite ends of the brush *g* and in position to slightly compress the bristles thereof (see Fig. 11), thereby throwing the dirt inward from the ends of the brush. This tends to prevent the leaving of streaks of dirt along the street at the ends of the brush.

With the foregoing construction, the method of use is preferably as follows: A plurality of dump wagons are provided, of the character shown and described, and these dump wagons take turns at hauling the sweeper. When a dump wagon is filled, the top of the wagon is uncoupled from the reach of the sweeper, and another wagon then backs into place and is connected with the sweeper. The wagon which is filled is then driven to the dumping place and its load there discharged. In this way, the sweeper is maintained continually in operation, or practically so, and while one dump wagon is hauling the sweeper the other dump wagon is traveling to and from the dumping place. The number of dumping wagons necessary in order to carry out this method of operation will depend, of course, upon the distance between the street being cleaned and the place where the sweepings are dumped. In any event, however, the wagons are adapted to be used interchangeably with one and the same sweeper and thus to successively serve not only as the motive power for hauling the sweeper, but also as a means for receiving the sweepings and transporting the same to the dumping place. Furthermore, it will be seen that with the foregoing construction and organization only one sweeping brush is necessary and that only one conveyer or elevator is necessary for taking the sweepings away from the receiver or dirt catcher. The spraying apparatus serves effectively to prevent dust, and for this reason, and because of the improved construction and arrangement shown and described, the use of certain devices which were heretofore considered necessary in a sweeping apparatus of this character is entirely obviated.

With the arrangement shown and described, the screw conveyer *l* is, like the brush *g* and the conveyer in the spout I, operated by a motor independently of the forward travel of the dump wagon A or other vehicle. Thus, the strain on the swivel B is considerably reduced, as none of the wheels of the sweeper are required for traction-driving purposes. Furthermore, the whole apparatus can be standing still, or the wagon A can be turning around, and still the brush and screw-conveyer on the sweeper will be operating at any desired speed, depending upon the speed of the engine or motor. The draft device D connects the swivel B with the front end of the sweeper, in the manner explained, and the latch 7 prevents shortening of the distance between the wagon and the sweeper, while the removable transverse pin *d* sustains the strain of the draft when the apparatus is moving forward. Thus, the wagon A travels ahead of the sweeper to furnish the motive power therefor, and to receive the sweepings, but the operation of the sweeper is entirely independent of the forward travel of the wagon and sweeper.

As shown and described, the rotary brush *g* and its housing (H and *h*) are movable up and down independently of each other, the brush floating freely up and down on the street as the machine moves forward. When the receiver H is moved up and down, the elevator casing I not only tilts about a horizontal axis, where it rests on the roll 14, but also slides up and down on this roll, the latter sustaining the weight of the elevator and facilitating its movements. The tapered forward-end-portion *f* of the body serves as a guard for the elevator casing, as anything striking the oblique forward edges of this portion will be prevented from getting against the elevator.

What we claim as our invention is:—

1. A street sweeping apparatus comprising a traveling body, a brush extending across the path of travel below said body, a motor on said body, power transmitting connection between said motor and brush, whereby the brush is operated to push the sweepings ahead thereof, a receiver arranged in front of said brush to catch the sweepings, a pipe having a conveyer therein leading upward and forward from said receiver, means in said receiver for delivering the sweepings to the lower end of said conveyer, devices by which the motor operates said means and conveyer, a support for said pipe, means whereby said pipe is tilted and also moved endwise on said support, a receptacle for the sweepings below the forward end of said conveyer, and provisions for causing forward movement of said body.

2. A street sweeping apparatus comprising a traveling body, a brush extending across the path of travel below said body, a motor on said body, power transmitting connection between said motor and brush, whereby the brush is operated to push the sweepings ahead thereof, a receiver arranged in front of said brush to catch the sweepings, a conveyer leading upward and forward from said receiver, means in said receiver for delivering the sweepings to the lower end of said conveyer, devices by which the motor operates said means and conveyer, a receptacle for the sweepings below the forward end of said conveyer, and provisions for causing forward movement of said body, mechanism on said body to raise and lower said receiver, said conveyer having a casing which is rigid with said receiver, a support on which said casing slides up and down during adjustment of said receiver, and separate means to raise and lower said brush relative to said receiver.

3. A street sweeping apparatus comprising a traveling body, a brush extending across the path of travel below said body, a motor on said body, power transmitting connection between said motor and brush, whereby the brush is operated to push the sweepings ahead thereof, a receiver arranged in front of said brush to catch the sweepings, a conveyer leading upward and forward from said receiver, means in said receiver for delivering the sweepings to the lower end of said conveyer, a receptacle for the sweepings below the forward end of said conveyer, and provisions for causing forward movement of said body, said receiver having a rearwardly extending hood which covers the brush, said conveyer comprising an endless belt inclosed by a casing, said receiver and hood and casing being all rigidly united and movable up and down, supports for said receiver, and means on the forward end of said body to support said casing intermediate the upper and lower ends thereof, whereon the casing slides up and down when said receiver and hood are adjusted.

4. Means for connecting a street-sweeper having a forward dirt-outlet-spout with a vehicle having a covered body provided with an inlet opening in the top thereof, comprising a draft connection from said vehicle to the forward end of said street sweeper, said street sweeper having rear wheels and a front caster wheel, being provided with a body which is tapered at the forwarded end thereof, said draft connection serving in conjunction with said caster wheel and the forward taper of the street sweeper to permit said vehicle to swing around against either side of said street-sweeper and an elevator for delivering the sweepings from the sweeper to said vehicle, said tapered body-portion forming a guard for said elevator.

5. Means for connecting a street-sweeper having a forward dirt-outlet-spout with a vehicle having a covered body provided with an inlet opening in the top thereof, comprising a draft connection from said vehicle to the forward end of said street sweeper, said draft connection being pivoted to swing horizontally about a pivot on the top of said receptacle, which pivot has an opening in the center thereof, and said conveyer having a discharge spout leading downward to said opening, whereby said spout and draft connection have a common vertical axis of motion relative to said vehicle.

6. Means for connecting a street-sweeper having a forward dirt-outlet-spout with a vehicle having a covered body provided with an inlet opening in the top thereof, comprising a draft connection extending rearward from said vehicle to the forward end of said street sweeper, said draft connection including a ring on the top of said receptacle, forming an inlet opening therefor, said ring having a rotating collar, and said spout leading downward to said opening.

7. Means for connecting a street-sweeper having a forward dirt-outlet-spout with a vehicle having a covered body provided with an inlet opening in the top thereof, comprising a draft connection extending rearward from said vehicle to the forward end of said street sweeper, said receptacle having a covered top provided with an inlet opening, said spout leading downward to said opening, and said draft connection extending upward and forward to the top of said receptacle.

8. A street sweeping apparatus comprising a traveling body, a brush extending across the path of travel below said body, devices whereby the brush is operated to push the sweepings ahead thereof, a receiver arranged in front of said brush to catch the sweepings, a conveyer leading upward and forward from said receiver, means in said receiver for delivering the sweepings to the lower end of said conveyer, a receptacle for the sweepings below the forward end of said conveyer, and provisions for causing forward movement of said body, means to raise and lower said receiver and elevator, devices to raise and lower the brush independently of said receiver, pivoted arms having a rear transverse axis of up and down movement and upon the forward ends of which said brush is mounted to rotate, the brush being movable up and down between said axis and receiver, and means on the rear portion of said arms to counterbalance the brush.

9. A street sweeping apparatus comprising a traveling body, a brush extending across the path of travel below said body, devices whereby the brush is operated to push the sweepings ahead thereof, a receiver arranged in front of said brush to catch the sweepings, a conveyer leading upward and forward from said receiver, means in said receiver for delivering the sweepings to the lower end of said conveyer, a receptacle for the sweepings below the forward end of said conveyer, and provisions for causing forward movement of said body, horizontal pivoted arms upon the front ends of which said brush is mounted to rotate, a hood rigid with said receiver and disposed between said arms to cover said brush, a power transmitting connection from said brush to said means, and means on said arms to counterbalance the brush.

10. A street sweeping apparatus comprising a traveling body, a brush extending across the path of travel below said body, devices whereby the brush is operated to push the sweepings ahead thereof, a receiver arranged in front of said brush to catch the sweepings, a conveyer leading upward and forward from said receiver, means in said receiver for delivering the sweepings to the lower end of said conveyer, a receptacle for the sweepings below the forward end of said conveyer, and provisions for causing forward movement of said body, said receiver having a hood extending rearward to cover said brush, means to raise and lower said receiver and hood, rigid guides for said receiver, and pivoted guides for said hood.

11. A street sweeping apparatus comprising a traveling body, a brush extending across the path of travel below said body, devices whereby the brush is operated to push the sweeping ahead thereof, a receiver arranged in front of said brush to catch the sweepings, a conveyer leading upward and forward from said receiver, means in said receiver for delivering the sweepings to the lower end of said conveyer, a receptacle for the sweepings below the forward end of said conveyer, and provisions for causing forward movement of said body, a shaft connected to raise and lower said receiver, a worm-gear mechanism to operate said shaft, serving to hold said receiver in raised position, said shafts being parallel and arranged transversely of the body, and means operable independently of said worm-gear mechanism and whereby said brush is free to rise and fall relative to said receiver as said body travels along the street.

12. A street sweeping apparatus comprising a traveling body, a brush extending across the path of travel below said body, devices whereby the brush is operated to push the sweepings ahead thereof, a receiver arranged in front of said brush to catch the sweepings, a conveyer leading upward and forward from said receiver, means in said receiver for delivering the sweepings to the lower end of said conveyer, a receptacle for the sweepings below the forward end of said conveyer, and provisions for causing forward movement of said body, said body having an opening in the forward portion thereof, in which opening said conveyer is arranged to move up and down, a roll mounted on said body to engage the under side of said conveyer and means to raise and lower the conveyer.

13. A street sweeping apparatus comprising a traveling body, a brush extending across the path of travel below said body, a motor on said body, power transmitting connection between said motor and brush, whereby the brush is operated to push the sweepings ahead thereof, a receiver arranged in front of said brush to catch the sweepings, a conveyer leading upward and forward from said receiver, a support on which said conveyer is movable by tilting motion thereof, means in said receiver for delivering the sweepings to the lower end of said conveyer, devices whereby said conveyer and means are operated by said motor, a receptacle for the sweepings below the forward end of said conveyer, and provisions for causing forward movement of said body, said means in the receiver including a shaft having two screw conveyers thereon, and said brush being connected to drive said shaft, means being provided behind said support to carry and raise and lower said brush and receiver without stopping said motor.

14. In a street sweeping apparatus comprising a traveling body, a transversely arranged brush extending across the path of travel below said body, devices whereby the brush is operated to push the sweepings ahead thereof, a receiver arranged in front of said brush to catch the sweepings, a conveyer leading upward and forward from said receiver, means in said receiver for delivering the sweepings to the lower end of said conveyer, a receptacle for the sweepings below the forward end of said conveyer, and provisions for causing forward movement of said body, the combination of a depending member on the side of said body and near the forward end thereof, ahead of said receiver, and a roll mounted to rotate about a vertical axis on the lower end of said member to engage the curb in front of one end of said brush at the side of the street.

15. A street sweeping apparatus comprising a traveling body, a brush extending across the path of travel below said body, devices whereby the brush is operated to push the sweepings ahead thereof, a receiver arranged in front of said brush to catch the sweepings, a conveyer leading upward and forward from said receiver, means in said receiver for delivering the sweepings to the lower end of said conveyer, a receptacle for the sweepings below the forward end of said conveyer, and provisions for causing forward movement of said body, said brush being cylindric in form, and inclined plates rigidly connected with said receiver and open between all of the edges thereof and engaging the ends of said brush below the axis thereof to narrow the brush on the ground and throw the sweepings inward, and means to raise and lower said brush between the lower edges of said plates.

16. A street sweeping apparatus comprising a traveling body, a brush extending across the path of travel below said body, devices whereby the brush is operated to push the sweepings ahead thereof, a receiver arranged in front of said brush to catch the sweepings, a conveyer leading upward and forward from said receiver, means in said receiver for delivering the sweepings to the lower end of said conveyer, a receptacle for the sweepings below the forward end of said conveyer, and provisions for causing forward movement of said body, said conveyer having a tubular casing with a flat lower side reinforced to form a trough having a flat bottom, means on the body to engage said casing, and means to raise and lower said casing by sliding movement thereof on said flat bottom.

17. Means for connecting a street-sweeper having a forward dirt-outlet-spout with a vehicle having a covered body provided with an inlet opening in the top thereof, comprising a draft device for the forward end of said sweeper, and a swivel associated with said opening to connect said draft device with said vehicle and maintain said spout in operative relation to the opening when the vehicle changes its direction of travel.

18. Means for connecting a street-sweeper having a forward dirt-outlet-spout with a vehicle having a covered body provided with an inlet opening in the top thereof, comprising a draft device for the forward end of said sweeper, and a swivel associated with said opening to connect said draft device with said vehicle and maintain said spout in operative relation to the opening when the vehicle changes its direction of travel, said swivel including a ring forming the mouth of said opening and a rotary collar encircling said ring.

19. Means for connecting a street-sweeper having a forward dirt-outlet-spout with a vehicle having a covered body provided with an inlet opening in the top thereof, comprising a draft device for the forward end of said sweeper, and a swivel associated with said opening to connect said draft device with said vehicle and maintain said spout in operative relation to the opening when the vehicle changes its direction of travel, said device being pivoted on said sweeper in a manner to swing up and down and prevent lateral movement relative to the sweeper.

20. Means for connecting a street-sweeper having a forward dirt-outlet-spout with a vehicle having a covered body provided with an inlet opening in the top thereof, comprising a draft device for the forward end of said sweeper, and a swivel associated with said opening to connect said draft device with said vehicle and maintain said spout in operative relation to the opening when the vehicle changes its direction of travel, said device having a separable connection between said swivel and the sweeper.

21. Means for connecting a street-sweeper having a forward dirt-outlet-spout with a vehicle having a covered body provided with an inlet opening in the top thereof, comprising a draft device for the forward end of said sweeper, and a swivel associated with said opening to connect said draft device with said vehicle and maintain said spout in operative relation to the opening when the vehicle changes its direction of travel, said device having a separable connection permitting up and down flexibility between the front and rear ends thereof.

22. Means for connecting a street-sweeper having a forward dirt-outlet-spout with a vehicle having a covered body provided with an inlet opening in the top thereof, comprising a draft device for the forward end of said sweeper, and a swivel associated with said opening to connect said draft device with said vehicle and maintain said spout in operative relation to the opening when the vehicle changes its direction of travel, said device having a separable connection provided with a removable transverse draft pin and a latch to prevent shortening of the distance between said vehicle and the sweeper.

23. A street sweeping apparatus comprising a wheeled body, a transversely arranged brush disposed below said body and mounted to float up and down freely on the street, a dirt receiver in front of said brush, a transverse feeding device in said receiver, an elevator leading upwardly from said device, said device constituting the sole means for delivering to said elevator, said elevator having a casing which is rigid with said receiver, instrumentalities on the body to operate said brush and device and elevator, means to move said body forward, elements on said body to carry and raise and lower said receiver and brush independently of each other, and a support in front of said elements and whereon said casing tilts during up-and-down motion of said receiver.

24. A street sweeping apparatus comprising a wheeled body, a transversely arranged brush disposed below said body and mounted to float up and down freely on the street, a dirt receiver in front of said brush, a transverse feeding device in said receiver, an elevator leading upwardly from said device, said device constituting the sole means for delivering to said elevator, said elevator having a casing which is rigid with said receiver, instrumentalities on the body to operate said brush and device and elevator, means to move said body forward, elements on said body to carry and raise and lower said receiver and brush independently of each other, and a support in front of said elements and whereon said casing tilts during up-and-down motion of said receiver, said elements including vertical fixed guides for said receiver, said brush having a hood which is rigid with said receiver, and pivoted guides for said hood.

25. A street sweeping apparatus comprising a wheeled body, a transversely arranged brush disposed below said body and mounted to float up and down freely on the street, a dirt receiver in front of said brush, a transverse feeding device in said receiver, an elevator leading upwardly from said device, said device constituting the sole means for delivering to said elevator, said elevator having a casing which is rigid with said receiver, instrumentalities on the body to operate said brush and device and elevator, means to move said body forward, elements on said body to carry and raise and lower said receiver and brush independently of each other, and a support in front of said elements and whereon said casing tilts during up-and-down motion of said receiver, said casing having means to slide on said support during the tilting thereof.

26. In a street sweeping apparatus comprising an elevator having a forward end provided with a spout, and means for moving said apparatus forward said means including a swivel having an axial opening disposed immediately under the end of said spout.

27. A street sweeping apparatus comprising a wheeled body, a transversely arranged brush disposed below said body and mounted to float up and down freely on the street, a dirt receiver in front of said brush, a transverse feeding device in said receiver, an elevator leading upwardly from said device, said device constituting the sole means for delivering to said elevator, instrumentalities on the body to operate said brush and device and elevator, means to move said body forward, and elements on said body to carry and raise and lower said receiver and brush.

Signed by us at Manchester, in the county of Delaware, State of Iowa this 1st day of Oct. 1915.

SEVER K. CLEVEN.
OBADIAH A. DUNHAM.